INVENTORS
JAMES L. LEESON, JR
BY JAMES R. VOSS

ATTYS.

United States Patent Office 3,206,641
Patented Sept. 14, 1965

3,206,641
SYNCHRONIZING ARRANGEMENT FOR AIRPLANE ENGINES AND THE LIKE
James L. Leeson, Jr., Beloit, Wis., and James R. Voss, Rockford, Ill., assignors to Woodward Governor Company, Rockford, Ill., a corporation of Illinois
Filed Jan. 22, 1962, Ser. No. 167,622
5 Claims. (Cl. 317—6)

The present invention relates to a master and slave engine and for making corrective speed adjustment to maintain the two engines in synchronism.

In prior application Serial No. 79,404, filed December 29, 1960 by James L. Leeson, Jr., there is disclosed a synchronizing arrangement which is sensitive to the change of phase between a master engine and a slave engine. Progressive change of phase in one direction as a result of the action of a phase comparator produces a series of square waves of progressively increasing width while a change of phase in the opposite direction produces a train of square waves of decreasing width. Such wave trains are integrated to produce sawtooth waves of positive and negative slope respectively. Waves of positive slope are utilized to bring about a corrective step change in the speed of the slave in one direction while waves of negative slope are utilized to bring about a corrective change of the slave in the opposite direction.

Successful operation of the above device is dependent upon the production of clearly defined trains of square waves having progressive variation in width. When the input signals are secured from sources capable of producing a clean signal, free of noise and transient variations, well defined stepping occurs. However, in a practical setup, particularly where there are gears in the mechanical system, the signal may evidence transient oscillations or "dither" with the slave signal oscillating between a slightly lagging condition and slightly leading condition at a high repetitive rate preventing the formation of well defined trains of pulses.

Accordingly it is an object of the present invention to provide an improved synchronizing arrangement which responds accurately to the condition of leading and lagging phase to bring about a corrective change in the phase while being insensitive to transient changes in phase between the leading and lagging condition occurring at a high repetitive rate. It is another object of the invention to provide an improved synchronizing arrangement which is non-critical as to input signal and which is therefore particularly well suited for synchronizing internal combustion engines where gearing is used and where the pickup elements are coupled to the engine indirectly and via coupling elements capable of introducing transient variations. Accordingly it is an object to provide an improved synchronizing arrangement in which the pickup elements need not be located directly at the engine but may be located in a region which is more convenient and accessible for servicing.

In one of the aspects of the invention it is an object to provide an improved synchronizing device embodying a tachometer indicator which may be constructed at a cost which is only a small amount greater than the cost of providing a tachometer of conventional design.

Other objects and advantages of the invention will become apparent upon reading the attached detailed description and upon reference to the drawings in which.

While the invention is described in connection with the preferred embodiment, it will be understood that we do not intend to be limited thereto but intend to cover the various alternative and equivalent devices which may be included within the spirit and scope of the appended claims.

Figure 1:
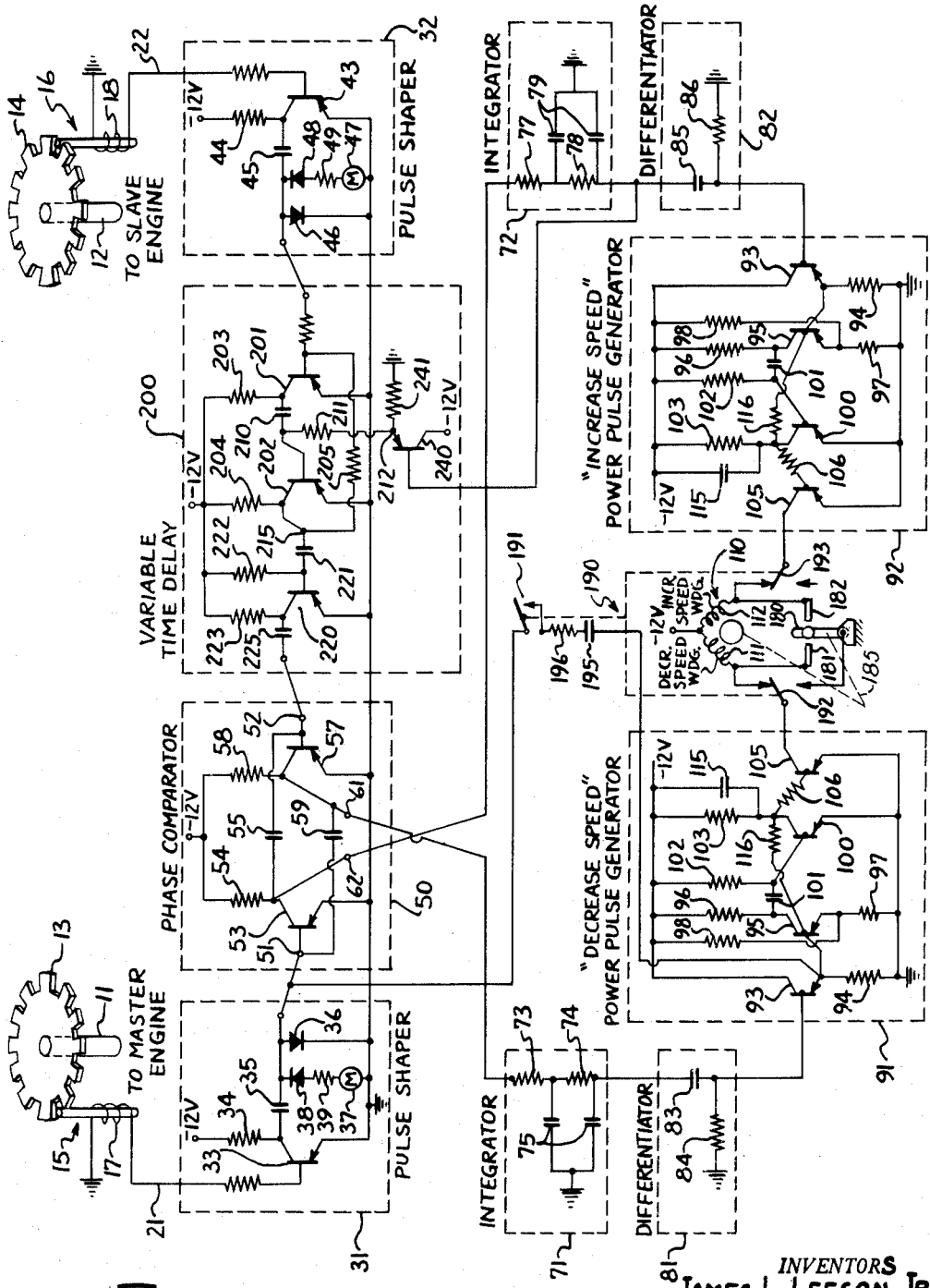
FIGURE 1 is a complete circuit diagram of a synchronizing device constructed and arranged in accordance with the present invention.

Turning now to FIG. 1 there is shown a schematic circuit diagram of a synchronizing system arranged in accordance with the present invention. The invention is described as applied to a master and a slave engine on a twin engine aircraft, although it will be apparent as the discussion proceeds that the invention is applicable to any multi-engine aircraft or to analogous applications where one or more power units are to be slaved in synchronism with a unit selected as the master. Thus the shaft 11 may be understood to be connected to the master engine and the shaft 12 to a slave engine. It is one of the advantages of the present arrangement that such coupling may be made through gears if desired without affecting the reliability of operation.

For the purpose of producing the repetitive pulsed output signal proportional to speed, with a predetermined number of pulses being indicative of a single revolution, toothed wheels 13 and 14 are mounted on the shafts and cooperating with pickup elements 15 and 16 respectively. The pickup element 15 preferably has a coil 17 surrounding a permanent magnet while the element 16 is provided with a coil 18. The result is to produce voltage waves at output lines 21, 22 respectively at a rate of, say, forty pulses per revolution, the number corresponding to the number of teeth on the wheel. While a gear on the engine crankshaft, for example, a starting gear, might be utilized, it will generally be found more convenient to employ specially toothed wheels in, or closely associated with, the engine governors.

For the purpose of converting the trains of pulses on the lines 21, 22, respectively, to more sharply defined pulses, pulse shapers 31, 32 are used. Taking the pulse shaper 31 by way of example it includes a special transistor 33 of the type known to the art as "Dynaquad" manufactured by Tung-Sol Electrical Inc., having a load resistor 34. Such a device saturates whenever the input current is above a threshold value and becomes substantially non-conductive when the input current is below the threshold value to produce a well defined square output wave. For the purpose of converting the square output wave from the transistor to a peaked unidirectional pulse, a differentiating capacitor 35 is used together with a short circuiting diode 36, the latter being polarized so that only negative peaks flow to the subsequent stage.

It is one of the features of the present pulse shaper 31 that it may be employed for driving an indicating meter which serves as a tachometer, thereby taking the place of the more expensive and elaborate mechanical tachometers usually employed in aircraft. The meter, indicated at 37, and which may be of the moving coil type, has a diode 38 in series therewith so that the meter responds only to negative peaks. For the purpose of calibration and to reduce the current through the meter to the desired level, a series resistor 39 is used. Because of the square wave nature of the output signal from the device 33, it is found that the negative pulses secured by the differentiating action of the capacitor 35 are of consistent energy content over a wide range of engine speed, making it possible for the meter 37 to produce accurate readings with a linear meter scale. Corresponding numerals 43–48 apply to the companion pulse shaper 32 associated with the slave engine.

For the purpose of producing square waves of output voltage which are of progressively increasing width or progressively decreasing width depending upon whether the slave is slow or fast, a phase comparator 50 is provided in the form of a bistable flip-flop circuit. The device 50 has a first input terminal 51 and a second input terminal 52. The circuit includes a first transistor 53 having a load resistor 54 and coupling capacitor 55 as well as a second transistor 57 having a load resistor 58 and a coupling capacitor 59. Both load resistors are connected to a source of negative or B— voltage. The coupling capacitors are, as shown, cross connected from the collector or output elements to the base or input elements respectively. The output terminals, indicated at 61, 62 are respectively connected to the collector elements and exhibit the swinging potentials which exist at the collectors due to the changes in the voltage drops in the respective load resistors.

Figure 2:
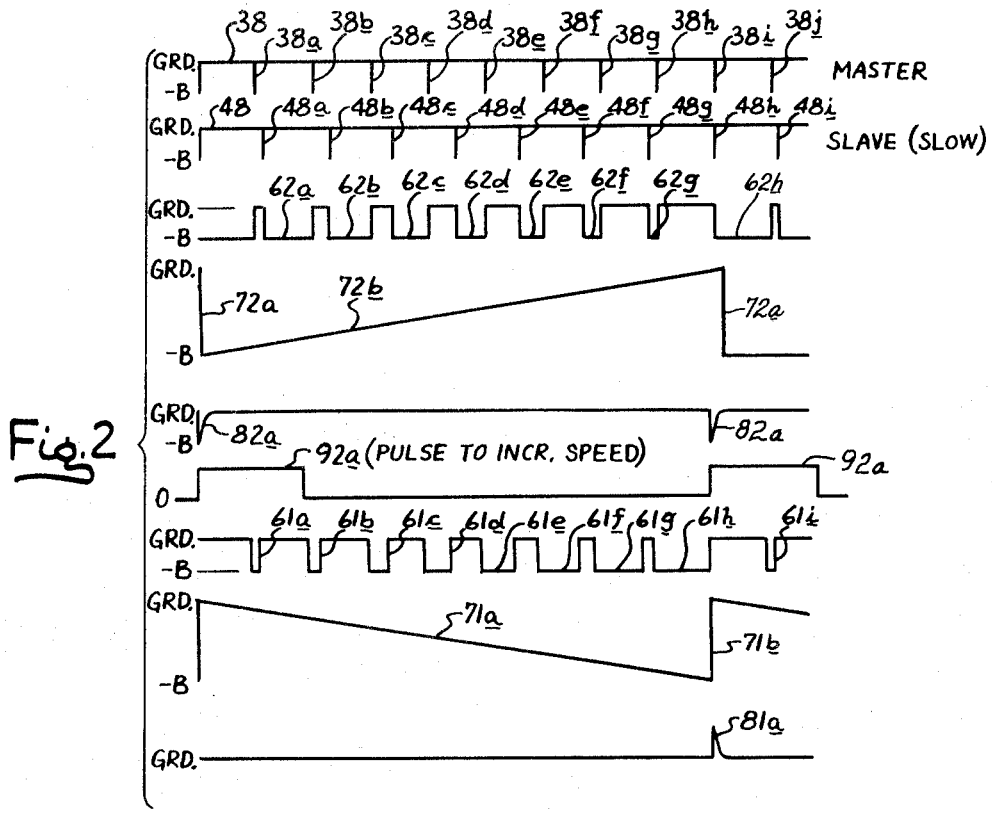
FIG. 2 shows the wave forms at various points in the circuit of FIG. 1.

In describing the operation of the bistable device 50 it will be helpful to refer to FIG. 2 which shows the wave forms at various points in the circuit. When the slave is slow, the negative input pulses, connected to the input terminals 51, 52 will not arrive simultaneously. On the contrary, the first pulse, indicated at 38a in FIG. 2, will arrive from the master engine first. This causes conduction in the first transistor 53. When the first transistor becomes conductive, it applies a positive-going voltage to the base element of the opposite transistor 57 through capacitor 55, thereby reducing conduction in the latter. The decrease in load current results in a negative-going voltage being applied to the input of the first transistor via capacitor 59. Since the action is regenerative, the first transistor becomes fully conducting, the second, non-conducting. As a result the voltage at output terminal 62 goes from substantially B— to ground. However, when a pulse 48a is received at a slightly later time at the second input terminal 52, this causes the transistor 57 to become conductive, causing a flow of current in its collector circuit. The resulting positive-going voltage is coupled to the base of the transistor 53 by the capacitor 59, turning off the transistor 53. The output terminal 62 is thus switched back to B—. The transistor 53 remains turned off, with terminal 62 remaining at B— potential, until a negative pulse 38b is received at the input terminal 51 which again turns on the transistor 53 defining a wide square wave of B— voltage as indicated at 62a. The transistor 53 remains conductive, with the transistor 57 non-conductive, for only a short space of time, until a negative input pulse 48b is received at the input terminal 52, which begins another square wave 62b. The width of each square wave pulse in the train 62 is therefore representative of the instantaneous phase angle between the master and slave pulses 38, 48. Since, as assumed, the two engines are rotating at different speeds, the phase discrepancy between them will continue to increase. Thus it will be noted that the B— square waves of the train 62a–62g are progressively narrower until the pulses 38, 48 from two engines are again momentarily back in phase with one another, which completes a single train or group of square waves. It may be noted that following the square wave 62g of minimum width, the subsequent square wave 62h is wide and corresponds to the initial square wave 62a to begin a new train or group. Thus, the square wave signal appearing on terminal 62 is constituted by successive groups of square pulses and with the pulses in each group being of progressively decreasing or increasing width depending upon whether the slave speed is slow or fast relative to the master speed, i.e., whether the phase of the slave pulses 48 is progressively shifting in a lagging or leading direction relative to the master pulses 38.

In the above, attention has been focused upon the negative square waves of voltage of decreasing width which appear at the output terminal 62. It will be understood by one skilled in the art that the negative square waves of output voltage which appear at the collector of the second transistor, and which are fed to the terminal 61, are a mirror image thereof, consisting of a series of complementary negative square waves 61a–61h which within each successive group, are of progressively greater width. On the other hand, if the slave were running faster than the master engine, the pulses within each group appearing on terminal 61 would be of progressively increasing width.

For the purpose of converting the trains of square waves into signals for producing forward and reverse operation of a speed-controlling motor associated with the slave governor, the trains of square waves are first integrated and then differentiated to produce one pulse for each train or successive group of square waves in each channel, with the polarity of the pulse depending upon whether the square waves are of increasing or decreasing width. Thus there is provided at the output terminals 61, 62 of the phase comparator, a first integrating device 71 and a second integrating device 72. The first integrator is made up of resistors 73, 74 and capacitors 75. The second includes an identical circuit made up of resistors 77, 78 and capacitors 76. Using an integrator 71 of relatively short time constant, and which in the present embodiment may be on the order of ten milliseconds, an intermediate signal of successive sawtooth waves is produced with each sawtooth having a gradual negative slope as indicated at 71a (FIG. 2) and an abrupt positive-going step as indicated at 71b. The reason for the gradually decreasing waveform, somewhat idealized in the drawing, is that the electric charge is fed to the capacitors at a progressively increasing rate but is leaked therefrom at a constant rate. When the increase in rate is terminated, as it is at the end of a discreet train or group of square waves represented at 61a–61h waves, the voltage rises rather abruptly at 71b with a subsequent gradual decrease in the next cycle. Because of the integrating action, therefore, the instantaneous magnitude of the intermediate voltage waveform 71 is substantially proportional to the phase angle between the pulses applied to the flip-flop input terminals 51 and 52 as that phase angle changes from 0° through a 360° angle and back to 0°. In the case of the output terminal 62 and the integrator 72, the output voltage of the latter is initially high or at ground potential, drops abruptly as at 72a, and is then progressively increased as indicated at 72b. In other words, the sawtooth waveforms from the integrator 72 have positive or negative slopes when the slave is running slow or fast relative to the master, and the instantaneous value of the waveform is substantially proportional to the phase angle between the pulses, 38, 48.

For the purpose of converting each sawtooth wave into a single sharp pulse for control purposes, differentiators are used as indicated at 81, 82. The differentiator 81 includes a capacitor 83 and resistor 84 connected to ground, while the differentiator 82 uses the capacitor 85 and the resistor 86. Focusing attention upon the left-hand channel, the output of the differentiator 81 is in the form of a positive pulse 81a. Meanwhile in the second channel negative square waves of decreasing width 62a–62g produce an abrupt drop in voltage 72a at the output of the integrator 72a, followed by a gradual rise of voltage over the cycle as shown at 72b. When this sawtooth wave is differentiated by the differentiator 82, a sharp negative pulse 82a is produced. This latter pulse is a speed correction signal utilized to correctively adjust the speed of the slave engine, as described below.

Means are provided at the output of the differentiators for responding to control pulses of one polarity while being non-responsive to the pulses of opposite polarity. In the present instance, only negative control pulses are utilized in each channel, while positive pulses are ignored. For the purpose of providing such polarity discrimination and for producing power pulses of a magnitude sufficient to actuate a speed correcting motor, power pulse generators 91, 92 are used in the respective channels.

Attention is turned to the details of the power pulse generator 91. Forming the input stage of the pulse generator is a transistor 93 having a load resistor 94 connected in its emitter circuit. This first stage produces relatively low level output and this output is in phase with the input analogously to a conventional cathode follower. Since conduction can only take place in the output circuit upon receipt of a negative input signal, the stage acts as a polarity discriminator, causing the power pulse generator as a whole to be responsive only to input pulses of negative polarity while ignoring the pulses of positive polarity which may come from the differentiator 81. In other words the power pulse generator 91 produces output pulses only when the speed of the slave is fast as compared with the master. Conversely, the power pulse generator 92 in the opposite channel, and which receives its signal from the opposite output terminal of the flip-flop 50, contains identical circuitry and thus is effective to produce an output signal to the motor only when the slave is running slow.

With the above in mind, attention may be given to the remainder of the pulse generator circuit. It includes a second transistor 95 having a load resistor 96 and a biasing circuit consisting of resistors 97, 98. The output of the transistor 95 is fed to the input of the transistor 100 through a coupling circuit comprising a coupling capacitor 101 and input resistor 102. Connected to the collector circuit of the transistor 100 is a load resistor 103. Finally, the output of the transistor 100 is connected to a power type output transistor 105 through a coupling resistor 106. Arranged in the load circuit of the amplifying transistor is a winding 111 of a motor 110, the second winding 112 of the motor being connected in the opposite channel.

Because the first stage is connected as a cathode follower, while the remaining three stages provide polarity inversions, it will be apparent that under normal conditions, i.e., up to the time of receipt of a negative pulse, output transistor 105 will be deenergized. However, in carrying out the invention means are provided in the pulse generator for producing sustained output pulses having a length which is adequate to produce positive operation of the motor 110, with the input pulses being utilized simply to trigger the circuit. This "holding action" is accomplished by the capacitor 101 and a feedback connection in the form of a resistor 116, connected between the output of transistor 100 and the input of the preceding transistor 95. The value of the coupling capacitor 101 is so chosen as to have relatively large storage capacity. To make the unit less susceptible to triggering due to random fluctuations of the power supply, particularly when one side has fired, a capacitor 115 is connected in parallel with the load resistor 103 of the third transistor.

The manner in which such components act to provide output pulses of predetermined length will be apparent upon considering a typical operating sequence. Upon receipt of a negative input pulse at transistor 93, the output of the transistor swings in a negative direction because of the cathode follower connection. This negative voltage is applied to the input of the transistor 95 which is normally biased to be non-conductive. This transistor conducts producing a positive-going output voltage which is coupled to the input of the succeeding transistor 100 by the coupling capacitor 101, causing the transistor 100 to become non-conductive. As a result the output or collector terminal of the transistor 100 swings negative which has two effects. The first effect is to apply negative voltage to the input of the amplifying transistor 105 causing the transistor to conduct heavily through the winding 111. The second effect is to apply negative voltage, through the feedback resistor 116, to the input of the preceding transistor 95. The resistor 116 thereby provides a second or "holding" input for the transistor 95 so that when the short negative input pulse is terminated, the transistor 95 does not revert to its non-conducting state but a negative voltage persists on the base terminal thereof causing the transistor to continue to conduct. Such conduction takes place for a finite length of time depending upon the capacitance of the capacitor 101 which tends to sustain a predetermined voltage at the output of the transistor 100.

Negative voltage also continues to be applied for such time interval to the input of the amplifying transistor 105 with the result that the winding 111 is energized for a predetermined time interval which greatly exceeds the length of the input pulse. When the charge in the holding capacitor 115 reaches an equilibrium value, there is no longer sufficient negative voltage to sustain the transistor 95 in its conducting state so that the transistor reverts to non-conduction. The latter causes the output terminal to swing negative and the negative going voltage is coupled through the capacitor 101 to the transistor 100 causing the same to become conductive. As a consequence the output terminal of transistor 100 swings in the positive direction, producing cut-off in the output transistor 105 and terminating flow of current in the winding 111 connected in its load circuit.

The circuitry of the power pulse generator 92 is as stated, identical to that described, and corresponding reference numerals are used. Under conditions when the slave is "slow," negative pulses (see 82a in FIG. 2) are fed from the differentiator 82 to the pulse generator 92 for actuating the winding 112 to bring about an increase in speed. The resulting current to the motor 110 is shown in FIG. 2. For each negative input pulse 82a, the pulse generator 92 produces a longer pulse 92a of current through the motor winding 112, causing the latter to execute one motion step so as to increase slightly the speed of the slave engine. It will be understood that when the opposite condition exists, that is, when the slave is "fast" the condition of the wave forms showing FIG. 2 is reversed so that the power pulse generator 91 receives the negative pulses required to produce corresponding current pulses through the motor winding 111, while the power pulse generator 92, receiving positive pulses only, is inactive.

In carrying out the present invention, the motor 110 is preferably in the form of a stepping motor having alternatively energizable windings for correctively adjusting the control elemnt and the governor of the slave engine in order to bring it toward synchronism with the master. It will be apparent, however, that the invention is not limited to use with a stepping motor, and a split field D.-C. motor may be used if desired.

Reference is made to the above-identified copending application Serial 79,404 for a detailed description of the motor 110 and its drive connection to the associated throttle linkage of the slave engine. It will suffice to say that in a practical case the motor 110 is connected by associated gearing to an adjustable link interposed in the slave throttle linkage between the throttle lever and the slave governor. Moreover, the motor 110 is preferably of the type commercially available under the trade name "Ledex." The motor is so constructed that a power impulse applied to one winding is effective to rotate the motor through one step of movement in one direction while a power pulse applied to the opposite winding is capable of rotating the rotor through one step of movement in the opposite direction. The motor must be deenergized for a sufficient length of time between successive impulses applied to one of the windings so that a spring return mechanism associated with such winding has time to return the mechanism to a reference starting position.

Means are preferably provided for causing the motor to drive the adjustable linkage to a central, reference position when the device is put into operation. As set forth diagrammatically in FIG. 1, the motor is provided with auxiliary centering contacts for causing a series of specially produced pulses to be fed to the appropriate motor winding to produce rotation of the motor in a direction to center the linkage. Specifically the motor is provided with a single pole double throw contact arm 180 having contacts 181, 182 on each side thereof. For the purpose of moving the switch arm 180 to a centered position, a stepdown connection, indicated diagrammatically at 185 is provided. For the purpose of supplying centering pulses to the motor windings, a control switch assembly 190 is employed which consists of three switches ganged together indicated at 191, 192, 193 (FIG. 1). The switch 191 serves to connect the second stage of the power pulse generator 91 directly to the pulse shaper 31 via a coupling capacitor 195 and series resistor 196. Thus when the switch 191 is closed, a series of driving pulses appears at the output of the power pulse generator 91. For the purpose of feeding such pulses to the movable arm of the centering switch, the single pole, double throw switch 192 is provided. To disconnect the winding 112 from the power pulse generator 92 to which it is normally connected, the disconnect switch 193 is used. It will be apparent, then, that when the switch assembly 190 is operated, pulses will be supplied to the contact arm 180, and if the arm is in an offset position, appropriate contact will be made with either fixed contact 181 or 182 to feed the pulses to the proper one of the windings 111 or 112. Thus rotation of the motor occurs accompanied by movement of the arm 180 until the arm is restored to its central position, whereupon the motor turns itself off. When this occurs the switch assembly 190 may be restored to its normal condition for synchronization.

In accordance with the present invention means are provided in at least one of the channels feeding the bistable phase comparator to modify the rate of receipt of the pulses at the transition point where the master and slave engines are momentarily in phase. As stated, the controlled system, because of the effect of gears, torsional vibration and other factors, may contain transients so that the pulses which are indicative of the speeds of the two engines may oscillate or "jitter" back and forth in relative phase at a rapid rate when the engines are nominally synchronized in speed. Thus the pulses received from the slave engine may oscillate rapidly between a slightly fast and slightly slow condition so that, instead of orderly stepping at the stepping motor 110, the motor is subjected to almost simultaneous arrival of "fast" and "slow" control impulses so that the action of the motor is indecisive. Moreover, when the stepping motor requires a finite length of time for resetting itself between successive impulses applied to the given one of the windings, the stepping impulses may be applied at such a high rate that the stepping motor does not have opportunity to respond to each of them individually.

In the present instance the desired variable time delay is brought about by a time delay circuit 200 which is interposed between the pulse shaper 32 and the input terminal 52 of the phase comparator. In carrying out the invention a monostable multivibrator is employed which is triggered by the pulses from the pulse shaper and which produces a square wave output with the width of the square waves being continuously varied in accordance with the amount of time delay required at any given instant. The trailing edge of the square waves is utilized to produce a sharply defined output pulse which is then fed to the phase comparator in place of the pulse received from the pulse shaper. It will be apparent that the time delay introduced by the circuit 200 for each individual pulse will be dependent upon the width of the square wave which serves, in effect, to "transport" such pulse through the unit.

Turning to the circuit diagram, the monostable flip-flop device has transistors 201, 202, having load resistors 203, 204. Regenerative action is provided by a feedback resistor 205 which is connected between the collector element of the second transistor and the base or input element of the first. A coupling capacitor 210 is provided for coupling the two stages together. Connected to the output side of the coupling capacitor is a resistor 211 which is connected to terminal 212 providing a variable negative voltage. Reference will be made to the source of the variable voltage at a later point in the discussion.

For the purpose of converting the trailing edge of the square wave produced by the monostable flip-flop circuit into a sharply defined negative output pulse, an output stage is employed having a transistor 220 and an associated differentiating network consisting of a capacitor 221 and resistor 222. A load resistor 223 is provided in the collector or output circuit of the transistor. Coupling takes place to the terminal 52 of the phase comparator via a coupling capacitor 225.

Figure 3:
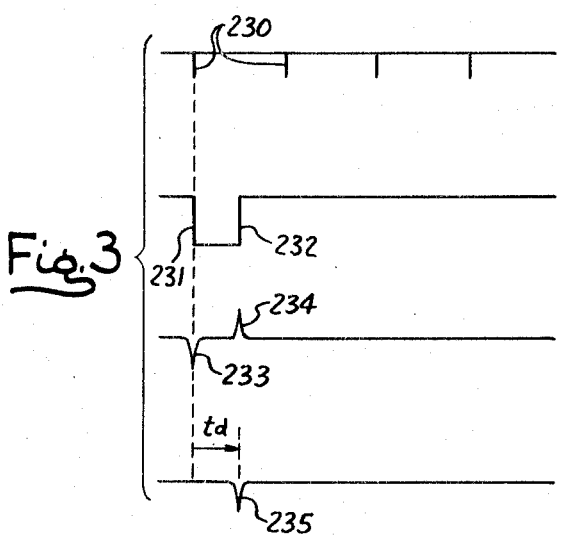
FIG. 3 is a diagram showing the action of the variable delay circuit.

To understand the operation of the delay circuit as thus far described, it will be helpful to consider the case where the control voltage from terminal 212 is at a constant value thereby to produce a fixed time delay. The wave forms at various parts of the circuit are shown somewhat idealized in FIG. 3. In this figure the input signal to the delay circuit is in the form of spaced negative pulses as indicated at 230, with attention being focused upon the first one of these pulses. Under initial conditions the first transistor 201 is non-conducting while the transistors 202 and 220 are biased to saturation. When a negative input pulse is received at the base of the transistor 201, the transistor is momentarily biased for conduction, producing a positive-going voltage at the collector which is coupled to the base of the second transistor by the coupling capacitor 210. This results in a momentary decrease in the conduction of the transistor 202 causing the collector or output terminal to swing in the negative direction and with such negative-going voltage being regeneratively applied to the input of the first transistor by the feedback resistor 205. This produces increased conduction in the first transistor. Since the effect is cumulative because of the feedback resistor, almost instantaneously the first transistor becomes conductive and the second transistor non-conductive. As a result there is produced at the terminal 215, the leading edge 231 of a square wave output pulse. After a short space of time, dependent upon the values of the capacitor 210, the resistor 211 and the voltage at the supply terminal 212, the charge is dissipated from the coupling capacitor, causing the base of the second transistor to swing slightly in the negative direction and reducing the conduction therein. The voltage at the collector becomes slightly positive-going, and such positive-going voltage, applied to the base of the first transistor reduces conduction in the first transistor. Again, the action is regenerative so that almost instantly the circuit snaps back to its original state with the first transistor non-conducting and the second transistor saturated, thereby creating the trailing edge 232 (FIG. 3) of the square output wave.

Because of the differentiating action of the capacitor 221, a leading edge pulse 233 is produced as well as a trailing edge pulse 234. The leading edge pulse, which is in the negative direction, has no effect since the transistor 220 is already saturated. However, the trailing edge pulse produces momentary non-conduction in the transistor 220 so that the collector element swings momentarily negative to produce a negative output pulse indicated at 235. It is this output pulse which is transmitted into the input terminal 52 of the phase comparator. It will be noted that the pulse is delayed in time by an interval $t_d$ as compared to the signal pulse 230 from the slave engine.

It will be understood by one skilled in the art that a constant time delay in the slave engine channel will have no effect upon the operation of the system since this is equivalent simply to offsetting the toothed wheel 14 which gives rise to the slave pulses. Consequently in carrying out the invention means are provided for varying the time delay interval according to variations in the relative phase of the pickup pulses derived from the slave and the master engine, especially when a pulse in the channel of the slave engine is fed to the phase comparator in phase with a pulse in the channel of the master engine. It will be recalled in the discussion of FIG. 2 that momentary phasing or alinement of the pulses 38, 48 from the two sources corresponds to the break point 72a of the sawtooth wave which is obtained by integrating the trains of square waves from the phase comparator. Accordingly, and in accordance with one of the aspects of the invention, the control voltage for the time delay circuit is derived from the sawtooth wave so that radically different amounts of time delay will be secured as the break point of each sawtooth wave is traversed. However, the objective here is to vary the delay interval of the time delay 200 substantially in accordance with the value of the phase angle between the master pulses 38 and the slave pulses 48, so that the delay changes gradually as the phase angle approaches 360°, and then "snaps" or abruptly changes to a different value as the phase angle returns to 0°. Thus, in the broader sense any signal representative of the phase angle between the pulses 38, 48 may be used to control the delay interval of the delay device 200.

For the purpose of amplifying the sawtooth wave and for preventing undesired interaction between the circuits, an amplifying transistor 240 is used having a load resistor 241. The transistor 240 acts as a cathode follower, with increasing negative voltage at the input producing increased conduction which results in increasing voltage at the output. It will be apparent, then, that when the sawtooth wave is at or near its negative peak value 72a, the negative voltage applied to the control terminal 212 will be maximum and when the sawtooth wave is at or approaching its minimum value (ground or zero volts) the negative voltage at the terminal will be at minimum. It can be shown that the time delay, i.e., the width of the square waves produced by the monostable multivibrator is inversely proportional to the negative voltage which is applied to the control terminal 212. This is but another way of saying that when the B— voltage of the sawtooth wave is a minimum (zero volts or ground), maximum time delay occurs and when the sawtooth wave is at a maximum B— value there is minimum time delay. It is helpful, in considering the operation of the circuit, to consider that the time delay device 200 produces a certain median time delay, with variations above and below the median value upon any decrease or increase in B— control voltage. Looked at in this way, the time delay device acts under one condition to delay the pulses 48 from the slave and, under the other condition, relatively, to accelerate the pulses.

Thus as the break point of the sawtooth wave is approached, either on a negative slope or on a positive slope, the circuit has no opportunity for indecision. When the break point is reached, the artificially induced change in the rate of receipt of the slave pulses causes the condition to "snap" over cleanly between the low point and high point of the sawtooth wave, with the result that clearly defined sawtooth waves are produced under all conditions. Well defined sawtooth waves in turn, produce well defined control pulses to be fed into the power pulse generators so that well defined power impulses are applied to the motor eliminating the chattering and indecision which characterizes the earlier synchronizing device in the face of input signals contaminated by transients. Experience has shown that the present device is capable of tolerating a high percentage of extraneous transient interference without affecting the accuracy of the result.

Since decisive, well defined power pulses are applied to the stepping motor 110, such motor is energized for a smaller proportion of the time and any possibility of overheating is avoided.

In the above discussion the time delay circuit 200 has been described as interposed in the slave channel. It will be understood by one skilled in the art that if desired the time delay may be introduced in the master channel or, if desired, in both of the channels. Also in the present device the control voltage for varying the amount of time delay has been derived from the sawtooth wave but it will be apparent that in the broader aspects of the invention the voltage may be derived from other points in the circuit with some sacrifice in the operating characteristics, provided that an artificially induced change of rate occurs when the pulses in the two channels are nominally synchronized and in phase to avoid the indecision which may occur by reason of the presence of transients.

In addition to the improvement brought about by the invention described above, it will be understood that the overall system possesses those features and advantages which are described in some detail in the copending application mentioned above.

We claim as our invention:

1. In apparatus for controlling an engine to synchronize its actual speed with a desired speed, the combination comprising first means for generating master recurring signals at a repetition rate substantially proportional to the desired speed, second means for generating slave recurring signals at a repetition rate substantially proportional to the actual speed of said engine, third means connected to receive and responsive to said master and slave signals for producing a correction signal each time that the phase of the master signal laps the slave signal by 360° in phase, means responsive to the correction signals for changing the actual speed of said engine to bring it into agreement with said desired speed, a variable time delay device interposed between one of said generating means and said third means, and means for varying the delay interval of said device according to the phase angle between said master and slave recurring signals.

2. In apparatus for synchronizing the speeds of a master and slave engine, the combination comprising first means for generating master recurring signals at a repetition rate substantially proportional to the speed of the master engine, second means for generating recurring slave signals at a repetition rate substantially proportional to the speed of the slave engine, third means responsive to said master and slave signals for producing a recurring squarewave signal which is constituted by successive groups of squarewave pulses with the successive pulses within a group being of progressively increasing or decreasing width depending upon whether the slave engine speed is faster or slower than the master engine speed, means responsive to said squarewave signal for correctively decreasing or increasing said slave engine speed when the successive pulses within said groups are of progressively increasing or decreasing width, a variable time delay device interposed between one of said generating means and said third means, and means responsive to said squarewave signal for varying the time interval of said delay means in accordance with an integral function of the squarewave signal.

3. In apparatus for controlling an engine to synchronize its actual speed with a desired speed, the combination comprising first means for generating master recurring signals at a repetition rate substantially proportional to the desired speed, second means for generating slave recurring signals at a repetition rate substantially proportional to the actual speed of said engine, third means connected to receive and responsive to said master and slave signals for producing an intermediate signal of recurring substantially sawtooth waveforms when said actual speed is mismatched from said desired speed and with the sign of the slope of said sawtooth waveforms corresponding to the sense of the speed mismatch, means connected to receive and responsive to said intermediate signal for correctively adjusting the speed of said engine in one direction or the other depending upon the sign of the slope of said sawtooth waveforms, variable time delay means interposed between one of said generating means and said intermediate signal generating means, and feedback means responsive to said intermediate signal for varying the delay interval of said time delay means according to the magnitude of such intermediate signal.

4. In apparatus for synchronizing a master and a slave engine or the like, the combination comprising first means for generating master recurring signals at a repetition rate substantially proportional to the speed of said master engine, second means for generating slave recurring signals at a repetition rate substantially proportional to the speed of said slave engine, phase comparing means responsive to said master and slave signals for producing a train of squarewaves which contains recurrent groups of pulses with the pulses of each group progressively decreasing or increasing, respectively, in width as the phase of said master and slave signals changes in a lagging or leading direction, means for integrating said train to produce an intermediate recurring signal of sawtooth waveforms having positive or negative slope when said square waves are decreasing or increasing in width, respectively, means responsive to said intermediate recurring signal for correctively increasing or decreasing the speed of said slave engine when the slope of the sawtooth waveforms is positive or negative, time delay means interposed between at least one of said generating means and said phase comparing means for delaying the generated recurring signal for a time interval, and feedback means responsive to said intermediate signal for varying the time interval of said time delay means.

5. In apparatus for synchronizing a master and a slave engine or the like, the combination comprising a first pickup device driven by said master engine for generating master recurring pulses at a repetition rate substantially proportional to the speed of said master engine, a second pickup device driven by said slave engine for generating slave recurring pulses at a repetition rate substantially proportional to the speed of said slave engine, a bi-state flip-flop device having first and second input terminals respectively connected to receive said master and slave pulses and having an output terminal on which appears a train of squarewaves which recurrently progressively decrease or increase, respectively, in width as the phase of said master and slave signals changes in a lagging or leading direction, means connected to receive said train for integrating the latter to produce an intermediate recurring signal of sawtooth waveforms having positive or negative slope when said square waves are decreasing or increasing in width, respectively, means responsive to said intermediate signal for correctively increasing or decreasing the speed of said slave engine when the slope of the sawtooth waveforms is positive or negative, time delay means interposed between at least one of said pickup devices and the corresponding flip-flop input terminal for delaying the corresponding recurring pulses for a time interval, and feedback means responsive to said intermediate signal for varying the time interval of said time delay means according to the phase angle between said master and slave pulses.

References Cited by the Examiner
UNITED STATES PATENTS

| 2,877,855 | 3/59 | Farkas | 317—6 |
| 2,982,920 | 5/61 | Feissel | 317—5 |
| 3,038,104 | 6/62 | Wessels | 317—6 |

SAMUEL BERNSTEIN, *Primary Examiner.*